United States Patent [19]

von Allwörden

[11] 4,058,990

[45] Nov. 22, 1977

[54] DEVICE FOR SUPPORTING THE DRIVE SHAFT OF AN AGRICULTURAL MACHINE FOR COUPLING TO A POWER TAKE-OFF SHAFT

[75] Inventor: Wilhelm von Allwörden, Lohmar, Germany

[73] Assignee: Jean Walterscheid GmbH, Lohmar, Germany

[21] Appl. No.: 717,609

[22] Filed: Aug. 26, 1976

[30] Foreign Application Priority Data

Aug. 26, 1975 Germany .............................. 2537841

[51] Int. Cl. ................................................. F16d 3/00
[52] U.S. Cl. ...................................... 64/1 S; 172/275; 180/14 R
[58] Field of Search .......................... 64/4, 23, 6, 1 S; 180/14 B, 53 R, 53 C, 14 R; 172/272, 275; 280/478 R; 74/15.6

[56] References Cited

U.S. PATENT DOCUMENTS

| | | | |
|---|---|---|---|
| 1,827,070 | 1/1928 | Coultas | 180/14 R |
| 2,614,403 | 6/1947 | Clausen | 64/1 S |
| 2,869,660 | 1/1959 | Miller | 64/29 |
| 3,385,388 | 5/1968 | Restall | 180/14 R |
| 3,891,237 | 6/1975 | Allen | 172/275 |
| 3,908,398 | 9/1975 | Braunberger | 180/14 B |

*Primary Examiner*—Samuel Scott
*Assistant Examiner*—R. C. Turner
*Attorney, Agent, or Firm*—Edmund M. Jaskiewicz

[57] ABSTRACT

An agricultural machine has a longitudinal variable drive shaft enclosed by a tubular casing for coupling to a power take-off shaft of a tractor. The drive shaft and power take-off shaft can be aligned and coupled to each other. The agricultural machine is further provided with a hitch bar and a support device is mounted on the hitch bar comprising a strut pivoted on the hitch bar so as to fold upon the bar in its axial direction. The other end of the strut engages and supports the drive shaft and a guide member has one end pivotally connected to the tubular casing and the other end pivotally connected to the strut so as to be slidable therealong.

7 Claims, 3 Drawing Figures

DEVICE FOR SUPPORTING THE DRIVE SHAFT OF AN AGRICULTURAL MACHINE FOR COUPLING TO A POWER TAKE-OFF SHAFT

The present invention relates to the coupling of a drive shaft of an agricultural machine to the power take-off shaft of a tractor, more particularly, to a device for supporting the drive shaft from a hitch bar on the agricultural machine.

In order to couple the drive shaft of an agricultural machine with the power take-off shaft of a tractor the shafts are provided with relatively self-aligning and lockable coupling devices. The tractor is also provided with a guide structure for guiding the drive shaft for coupling to the power take-off shaft and the drive shaft is supported from the hitch bar of the agricultural machine by a guide structure.

One form of a device for supporting the drive shaft from the hitch bar of an agricultural machine comprised a double parallelogram wherein the elements thereof are pivotally connected to each other and a clamp holder which engaged the cardan shaft of the agricultural machine. The outer tubular protective casing of the telescoping cardan shaft was additionally supported by two upwardly directed arms or brackets. The telescopic tubular casing was axially slidable between these arms in a ring bearing so as to be vertically adjustable by means of a number of openings formed in the supporting brackets.

This supporting device for a cardan or drive shaft of an agricultural machine had the disadvantage that the manufacture of a double articulated parallelogram involved considerable technical difficulties and expense. In addition, it was generally necessary to provide a third joint fitted directly on the agricultural machine in order to enable the telescoping drive shaft to cope with the variations of angle formed by the shaft and the longitudinal axis of the agricultural machine during vertical adjustment of the shaft. The additional supporting arms and the third pivot joint involved further unnecessary expense and provided a relatively complicated structure.

It is therefore the principal object of the present invention to provide a novel and improved device for supporting the drive shaft of an agricultural machine for coupling to the power take-off shaft of a tractor.

It is another object of the present invention to provide such a supporting device which is simple in construction, reliable in operation, easier to operate during coupling and uncoupling operations and involves less manufacturing expense.

According to one aspect of the present invention a device for supporting the drive shaft of an agricultural machine for coupling to the power take-off shaft of a tractor may comprise a drive shaft on an agricultural machine and a tubular casing enclosing the drive shaft. Means are provided on the drive shaft and tractor power take-off shaft for aligning and coupling the shafts with respect to each other and the agricultural machine is provided with a hitch bar. A strut has one end pivotally mounted on the hitch bar so as to pivot upon the hitch bar in the axial direction thereof. The other end of the strut is provided with means for engaging and supporting the drive shaft. A guide member has one end pivotally connected to the tubular casing enclosing the drive shaft and its other end pivotally connected to the strut.

The supporting device of the present invention has the advantage that during the coupling operation the drive shaft of the agricultural machine is supported by a strut which is foldable along the axial direction of the hitch bar and that during the coupling operation this strut can be disengaged from the drive shaft by means of a guide member interconnecting the strut and drive shaft. The supporting device is simple in construction in that no parallelogram articulations or third shaft joints are required.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modification of the present invention will be described in detail.

Figure 1:
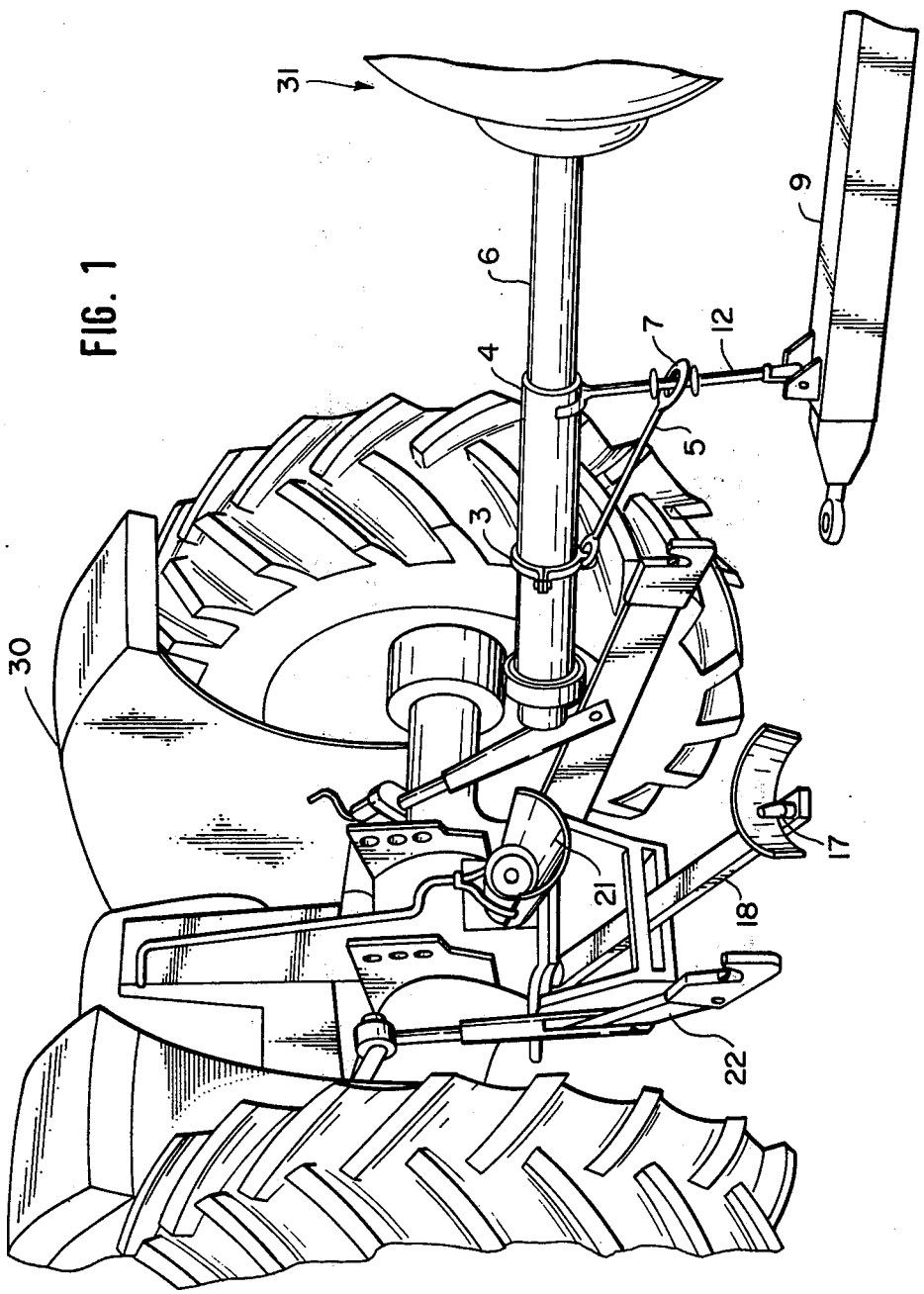
FIG. 1 is a perspective view of the rear of a tractor and of a portion of an agricultural machine having the drive shaft supporting device according to the present invention.

As may be seen in FIG. 1, an agricultural tractor 30 has a power take-off shaft on the end of which is a splined conical coupling element 20 for driving connection to a correspondingly shaped coupling element on a drive shaft of an agricultural machine. The tractor 30 is also provided with a tractor hook 17 on the end of a traction bar 18 whose inner end is pivotally connected at 19 to the tractor. The traction bar 18 is guided in a frame and is pivotable in the vertical direction by a hydraulically operated lifting linkage indicated diagrammatically at 22 so that the hook 17 can be raised and lowered. A guide plate 21 is positioned adjacent the power take-off shaft coupling element 20 to accurately introduce and center the drive shaft during the coupling operation.

An agricultural machine which is to be coupled to the tractor is indicated as 31 and comprises a telescoping drive or power transmission shaft 6 enclosed by a telescoping protective tubular casing 4 on the other end of which is provided a conical flexible protective boot 2 enclosing a quick-release coupling device 1.

Figure 2:
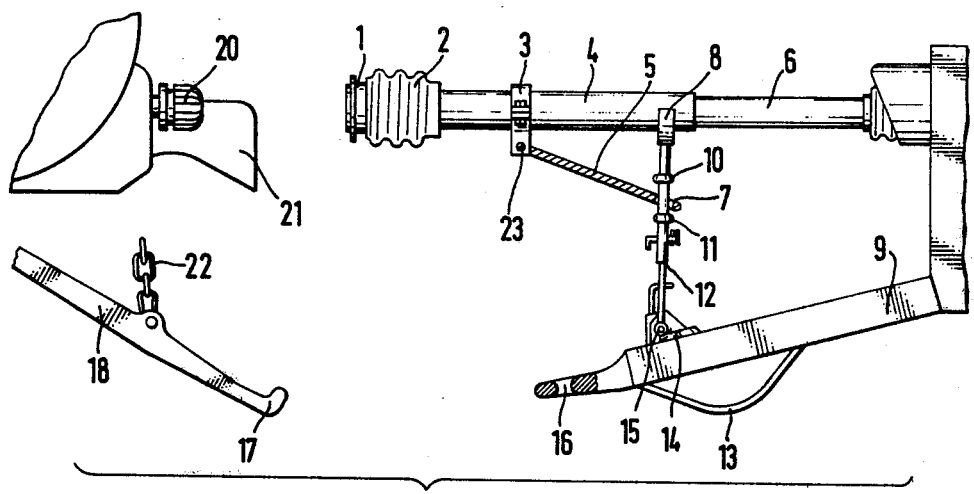
FIG. 2 is a side elevational view of the supporting device of FIG. 1 showing the support and coupling elements in a position ready for coupling of the drive shaft to the power take-off shaft.
Figure 3:
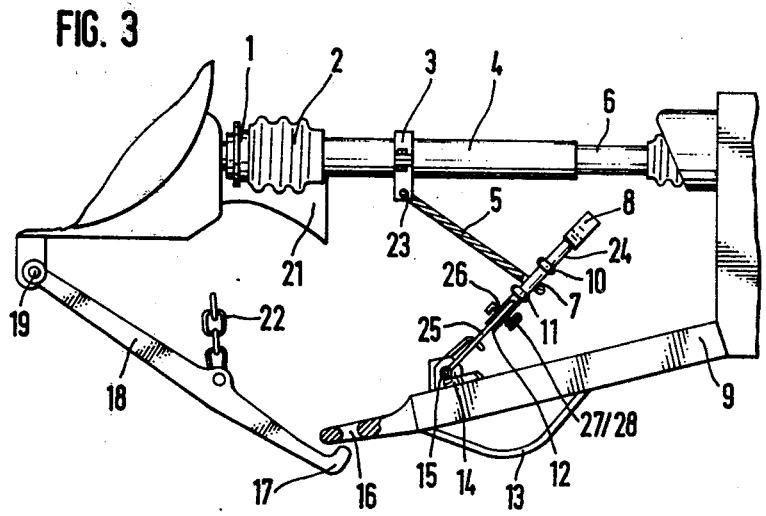
FIG. 3 is a view similar to that of FIG. 2 but showing the support and coupling elements immediately prior to the completion of the coupling operation.

A ring 3 is clamped upon the tubular casing 4 and is provided with a pivot connection 23 to which is connected one end of a guid member 5. The other end of the guide member 5 is provided with an eye 7 which is of a slightly elliptical shape. Slidably received within the eye 7 is a strut 12 upon which are positioned spaced stop elements 10 and 11 to limit the sliding movement of the eye 7 on the strut. The strut 12 has its lower end pivotally connected by a bolt 15 onto hitch bar 9 attached to the agricultural machine 31. The upper end of the strut 12 is provided with a fork 8 which engages and supports the guide shaft as shown in FIG. 2.

The strut 12 comprises a pair of telescoping tubes 24 and 25 which are provided with a plurality of holes 26 therein to receive a locking bolt 27 secured by a cotter pin 28 in order to adjust the length of the strut 12.

A torsion spring 14 is positioned around the bolt 15 and has one arm bearing against the hitch 9 and the other arm against the strut 12 so as to bias the strut into an upright position to support the drive shaft.

The hitch bar 9 is provided at its end with a traction eye or loop 16 which is engageable with the traction hook 17 on the tractor. On the underside of the hitch bar 9 there is provided a leg or ground support 13.

In order to couple the agricultural machine to the tractor, the tractor is driven in reverse in the direction toward the agricultural machine and the tractor traction hook 17 is hydraulically lowered. The splined end 20 of the power take-off shaft approaches the tapering splined connection of the coupling device 1 on the drive shaft 6 of the agricultural machine. The coupling device 1 is guided by the guide plate 21 in the direction toward the takeoff shaft splined end 20 and further movement of the tractor in the reverse direction will cause the quick coupling device 1 to be lockingly coupled with the splined end 20. Up to this point, the torsion spring 14 on the strut 12 will ensure that the quick coupling device 1 will engage without telescopingly compressing the tubular casing 4 of the similarly telescoping drive shaft 6. The tractor will continue in the reverse direction until the traction hook 17 is positioned directly underneath the traction loop 16 on the hitch bar 9. The traction bar 18 is now pivoted upwardly about its pivot connection 19 under the action of the hydraulic lift 22 until the traction hook 17 is completely inserted within the loop 16. During this functional operation, the telescopic tubular casing 4 is telescopingly compressed or pushed together by the reverse movement of the tracotr. The ring 3 secured to the tubular casing 4 is also moved rearwardly to cause the guide member 5 through its sliding eye connection 7 to push the strut 12 rearwardly or toward the left as viewed in the drawings against the force of the torsion spring 14.

This pivoting movement of the strut 12 causes the fork 8 to become disengaged from the casing 4 and no longer support the casing. The strut 12 will be folded down in the direction of the longitudinal axis of the hitch bar 9. The coupling operation has now been completed with the assistance of the support structure. The eye 7 is shaped so as to permit lateral deviation of the drive shaft with respect to the hitch bar 9 during cornering of the tractor and agricultural machine without jamming or wedging against the strut 12.

During uncoupling of the agricultural machine drive shaft from the power take-off shaft of the tractor, the telescopic tubular casing 4 together with the coupling device 1 will be moved toward the tractor by the pivoting of the strut 12 to its upright position under the action of the torsion spring 14. The action of the torsion spring 14 against the strut 12 will move the guide member 5 which in turn is pivotally connected to the ring 3 secured to the tubular casing 4. Accordingly, the strut 12 is moved to its upright position and again supports the protective tubular casing 4 by its fork 8. The components of the agricultural machine are now in position for the next coupling operation.

The support means of the agricultural machine can be varied for different heights because of differences in construction by adjusting the strut 12 by repositioning its telescoping tubes 24 and 25 and locking the tubes in adjusted position by means of the locking bolt 27.

It will be apparent that the pre-stressed torsion spring will maintain the drive shaft 6 of the agricultural machine at the proper level for coupling by means of the supporting strut 12 and the fork 8. At the same time, the force of the torsion spring will facilitate engagement of the coupling device 1 during the coupling operation.

The clamping ring 3 which is attached upon the tubular casing 4 is a component of the protective guide assembly for the drive shaft and accordingly the clamping ring will follow axial displacement of the telescoping casing. Thus, the clamping ring will fold down the strut 5 together with its fork 8 away from the casing 4 during the coupling operation in opposition to the force exerted by the torsion spring 14 by acting through the guide member 5. After the coupling device has been released, the clamping ring under the action of the guide member 5 and strut 12 will advance the tubular casing 4 under the force of the torsion spring 14. At the same time the strut 5 will be pivoted to its upright position so that the casing and drive shaft are in the correct coupling position and will be retained in this position by the fork 8.

It is to be noted that the guide member 5 is slidable on the strut 8 between a pair of spaced stops 10 and 11. The eye 7 on the guide member 5 which receives the strut 12 is elliptical in shape so as to make it possible for the strut 12 under the force of the torsion spring to push the casing 4 and the coupling device 1 into the correct coupling position. In addition, the guide member 5 will fold down or collapse the strut 12 in the axial direction against the force of the torsion spring by the action of the eye 7 upon the strut 12. The eye 7 also provides for compensation of any lateral deviations of the drive shaft 6 with respect to the hitch bar 9 which may occur during agricultural operations such as during cornering. The eye will also allow for length adjustment and steering deviations.

Thus it can be seen that the present invention has provided an effective support device for the drive shaft of an agricultural implement which assures that the drive shaft will always be in the correct position for coupling to the power take-off shaft of a tractor and which will also assist in the uncoupling operation.

It will be understood that this invention is susceptible to modification in order to adapt it to different usages and conditions, and accordingly, it is desired to comprehend such modifications within this invention as may fall within the scope of appended claims.

What is claimed is:

1. A device for supporting the drive shaft of an agricultural machine for coupling to the power take-off shaft of a tractor comprising a drive shaft on an agricultural machine and a tubular casing enclosing said drive shaft, means on said drive shaft and a power take-off shaft of a tractor for aligning and coupling the shafts with respect to each other, a hitch bar on the agricultural machine, a strut having one end pivotally mounted on said hitch bar to pivot upon said hitch bar in the axial direction thereof, means on the other end of said strut for engaging and supporting the drive shaft, and a guide member having one end pivotally connected to said tubular casing and the other end pivotally connected to said strut.

2. A device as claimed in claim 1 wherein said strut engaging and supporting means comprises a fork.

3. A device as claimed in claim 1 and further comprising a torsion spring between said strut and said hitch bar to urge said strut into position to support said drive shaft.

4. A device as claimed in claim 1 and comprising a ring clamped to said tubular casing and having a pivot connection thereon, said guide member one end being attached to said pivot connection.

5. A device as claimed in claim 1 wherein said guide member other end is slidably connected to said strut, and means on said strut for limiting the range of sliding movement of said guide member other end on said strut.

6. A device as claimed in claim 5 wherein said limiting means comprises a pair of spaced stops on said strut.

7. A device as claimed in claim 1 and means on said strut for adjusting the length thereof.

* * * * *